United States Patent [19]

Iwaki

[11] 4,422,365

[45] Dec. 27, 1983

[54] DRIVE CONTROL SYSTEM FOR DISPLAY DEVICES

[75] Inventor: Shunichi Iwaki, Kodaira, Japan

[73] Assignee: Casio Computer Co., Ltd., Tokyo, Japan

[21] Appl. No.: 331,159

[22] Filed: Dec. 16, 1981

[30] Foreign Application Priority Data

| | | | |
|---|---|---|---|
| Dec. 24, 1980 | [JP] | Japan | 55-184383 |
| Dec. 24, 1980 | [JP] | Japan | 55-184384 |
| Jul. 2, 1981 | [JP] | Japan | 56-103924 |

[51] Int. Cl.³ .......................... G09B 15/08; G06F 3/02

[52] U.S. Cl. .................................... 84/478; 84/470 R; 340/365 S; 340/802

[58] Field of Search ............................ 84/470 R, 478; 340/286 M, 807, 365 S, 802, 712, 789; 434/228, 232

[56] References Cited

U.S. PATENT DOCUMENTS

| | | | |
|---|---|---|---|
| 3,950,743 | 4/1976 | Hatano et al. | 340/789 X |
| 3,990,070 | 11/1976 | Spence | 340/365 SX |
| 4,051,471 | 9/1977 | Hatano et al. | 340/365 S |
| 4,281,579 | 8/1981 | Bennett, Sr. | 84/478 |

*Primary Examiner*—William B. Perkey
*Attorney, Agent, or Firm*—Frishauf, Holtz, Goodman and Woodward

[57] ABSTRACT

Light-emitting diodes (LEDs) are provided for operation keys such as a tone select switch or performance keys of an electronic musical instrument. The display drive lines for the LEDs are arranged in the form of a matrix, and a dynamic drive signal is supplied to them. With these LEDs, the operation state of the operation keys is indicated. The LEDs are adapted to indicate the performance key to be operated next to the player.

12 Claims, 28 Drawing Figures

DRIVE CONTROL SYSTEM FOR DISPLAY DEVICES

BACKGROUND OF THE INVENTION

This invention relates to a drive control system for display devices for controlling the driving of the display elements arranged for keys or operation switches such as a tone select switch, etc.

Hitherto, for controlling the driving of the display elements provided for respective operation switches mounted in an electronic apparatus, it has been in practice to provide control lines each for each of the display elements and supply drive signals independently of the lines. For example, light-emitting elements (LEDs) are turned on and off as the display elements by changing a control line voltage to a low or high level.

However, where the aforementioned method is applied to an electronic musical instrument, where a number of operation switches such as a tone select switch for selecting the tone and a rhythm select switch for selecting the rhythm are used, a large number of control lines for the display elements provided for the operation switches have to be used. This complicates the wiring, which has been a drawback in view of mass production.

When practicing the performance of a new piece of music using a musical instrument having a keyboard, it is usual to judge the pitch and interval of the musical sound to be produced next, and also the position of a pause from the score, and to operate keys on the keyboard correspondingly. Although this practice is not so difficult to one who has acquired a certain skill of playing the instrument, for the beginner it takes a considerable time to operate keys while watching the score so as to perform a desired piece of music. The fact that practice requires a great deal of time often causes a beginner to give up his intention to master a piece. In this respect, instruments, in which LEDs are provided in correspondence to respective keys in the neighborhood of the keyboard so that at the time when a key is depressed an LED for the key to be operated next is turned on to facilitate the practice of the trainer, thus permitting the trainer to become able to easily perform the piece in a short period of time, have been contemplated. In this case, the control of the LEDs has been done by providing control lines each for each of the LEDs and changing the control line voltage to low or high level for turning on or off the LEDs.

With this method, however, if there are keys for five octaves, i.e., 60 keys, 60 display elements are necessary. In this case, wiring of the electronic musical instrument is extremely complicated, and the efficiency of the wiring operation is low.

SUMMARY OF THE INVENTION

The object of the invention is to provide a drive control system for display devices, which permits efficient driving of display devices provided for respective operation keys with reduced wiring leads required.

According to the invention, the above objective is attained by an electronic musical instrument having a plurality of operation keys and display devices provided for said individual operation keys, comprising wiring means wiring said display elements in a matrix form for selectively turning on said display devices, and drive signal generating means for supplying a drive signal for selectively turning on said display devices through said wiring means.

Figure 2:
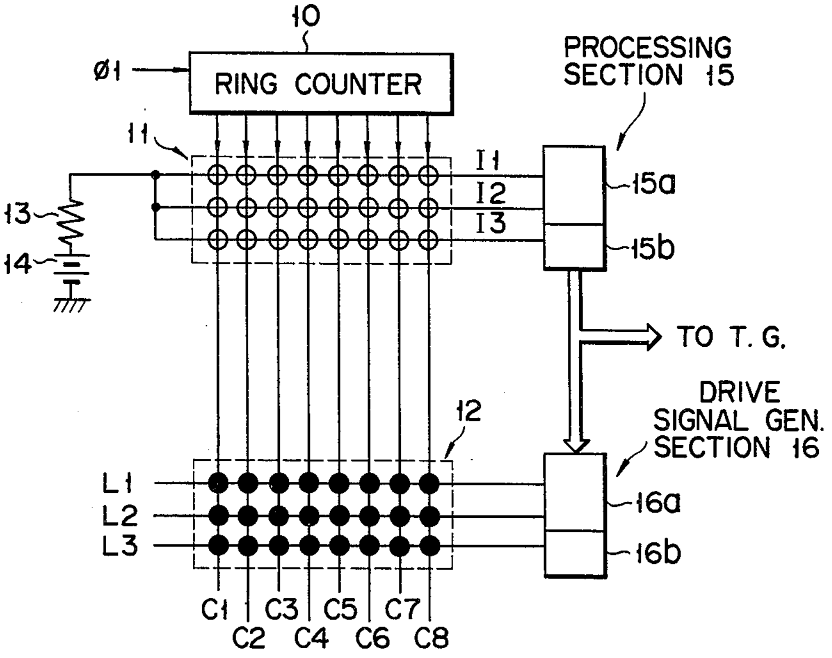
FIG. 2 is a circuit diagram showing the circuit construction of an essential part of the embodiment of FIG. 1.
Figure 7:
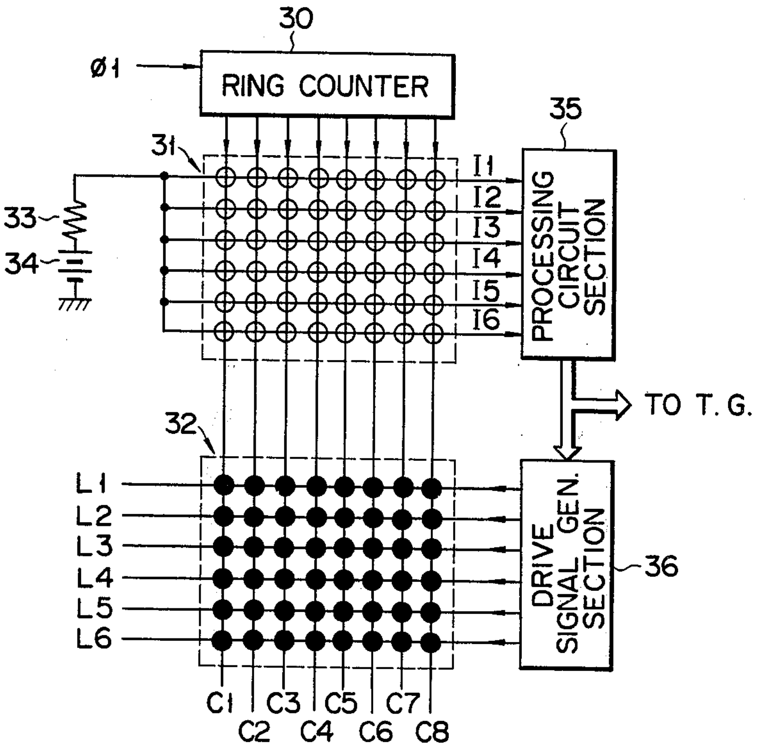
FIG. 7 is a circuit diagram showing the circuit construction of an essential part of the embodiment of FIG. 6.
Figure 10:
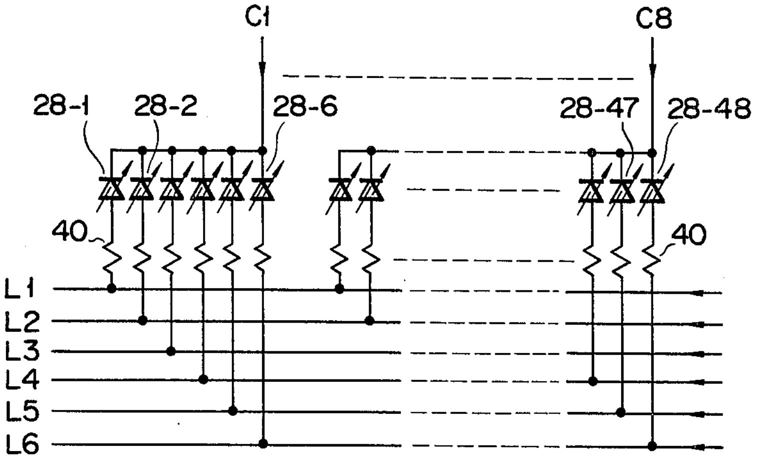
Figure 9A:
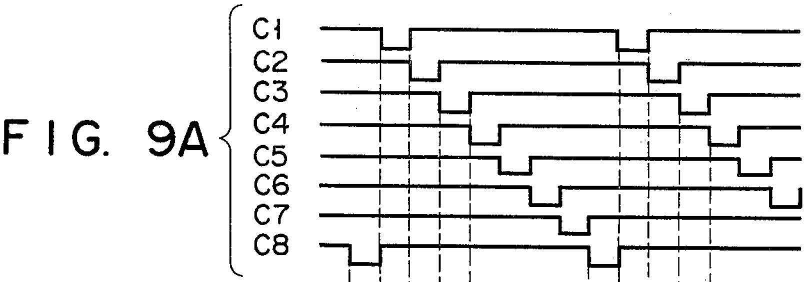
Figure 9B:
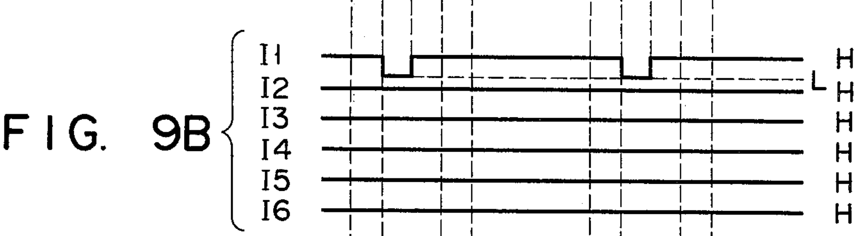
Figure 9C:
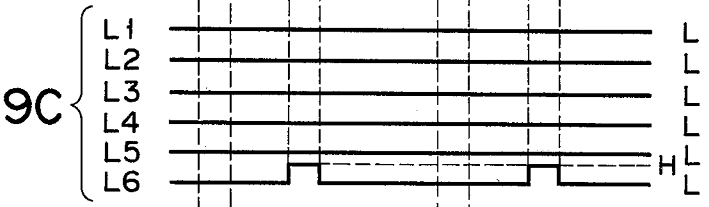
Figure 9D:
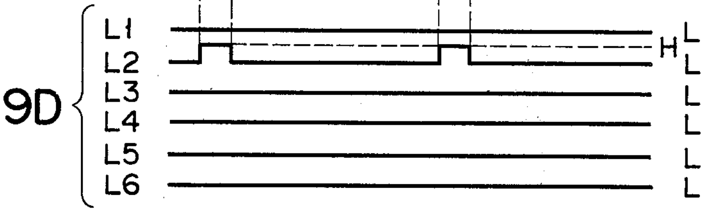
Figure 11:
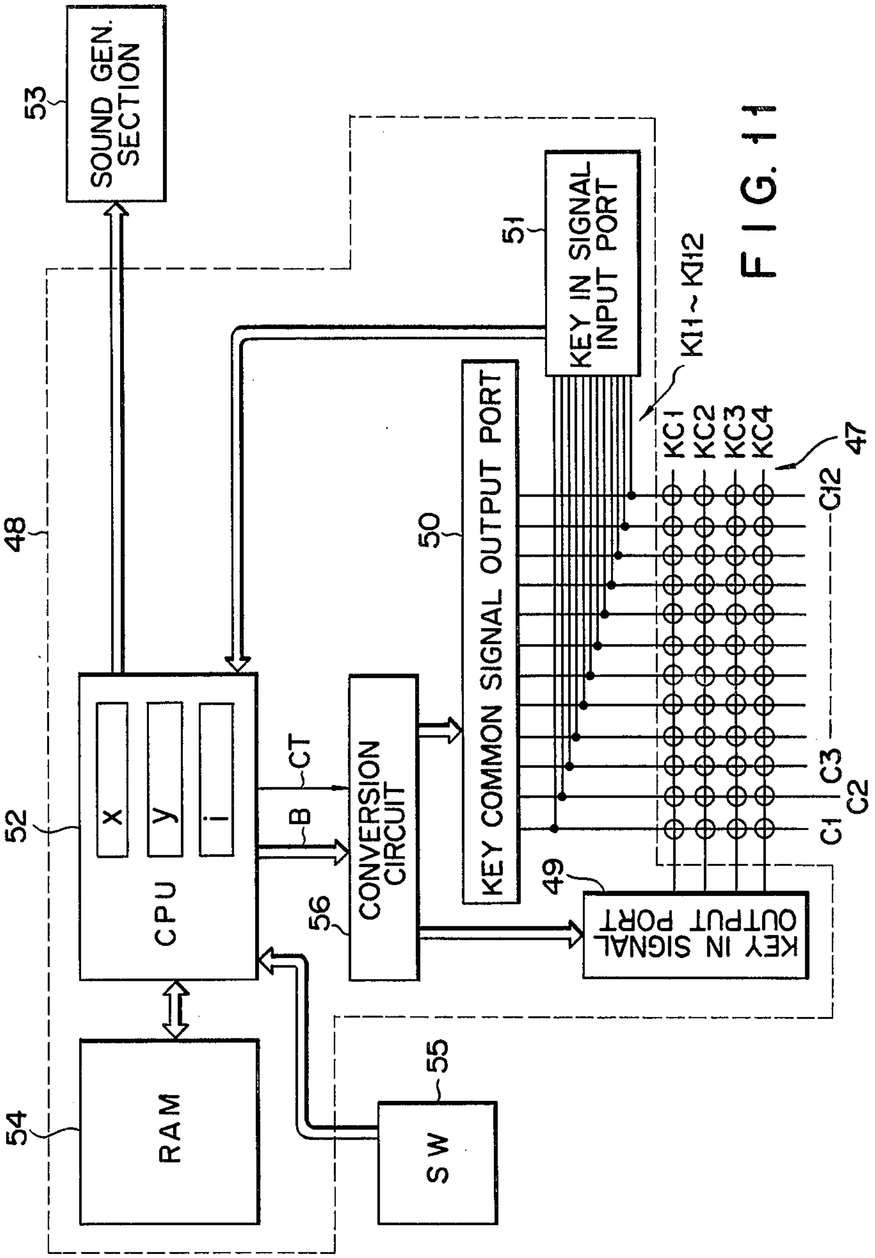
Figure 12:
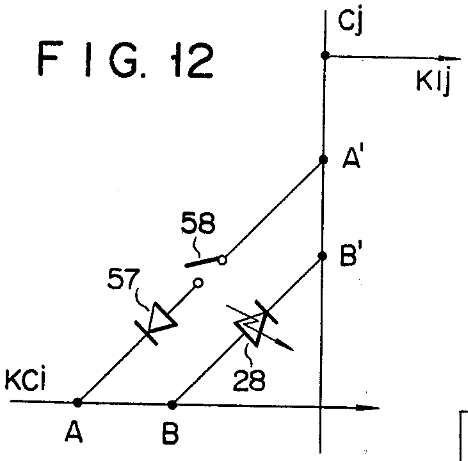
Figure 13:
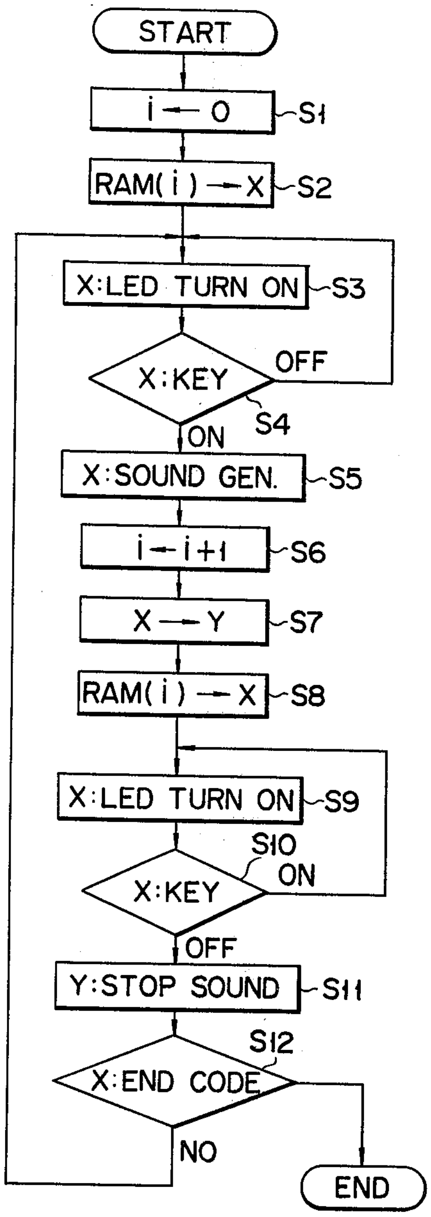

FIGS. (9A, 9B, 9C, and 9D are time charts for illustrating the operation of the circuit shown in FIG. 7;

FIG. 10 is a circuit diagram showing a modification of the wiring of LEDs shown in FIG. 7;

FIG. 11 is a perspective view showing a further embodiment of the electronic musical instrument according to the invention;

FIG. 12 is a view showing the wiring of control lines in a matrix section shown in FIG. 2;

FIG. 13 is a flow chart illustrating the operation of the circuit shown in FIG. 11;

FIGS. 14 to 17 are views for illustrating the operation of the matrix section shown in FIG. 13 according to voltages supplied to tone control lines; and FIGS. 18 to 21 are views showing the operation of a modification of the matrix section shown in FIG. 13.

DETAILED DESCRIPTION OF THE PREFERRED EMBODIMENTS

Figure 1:
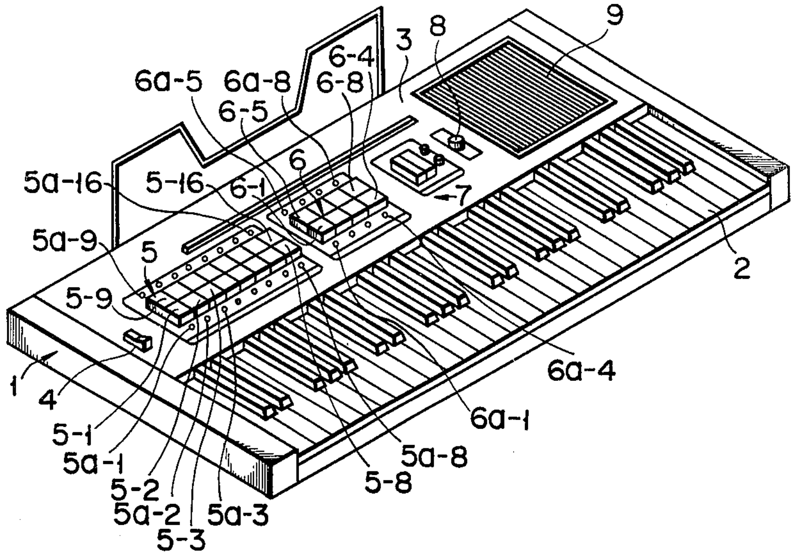
FIG. 1 is a perspective view showing an embodiment of the electronic musical instrument according to the invention.

Referring now to FIG. 1, there is shown an electronic musical instrument comprising a case 1. A keyboard 2 is provided on top of a front portion of the case 1, and an operating panel 3 is provided behind the keyboard 2. On the operating panel 3, a power switch 4, a tone switch section 5 for selecting the tone of piano, organ, etc., and a rhythm switch section 6 for selecting the rhythm of lock, waltz, etc. are provided. The switch sections 5 and 6 include switches 5-1 to 5-16 and 6-1 to 6-8 and also LEDs 5a-1 to 5a-16 and 6a-1 to 6a-8. The operating panel 3 is further provided with a rhythm start switch section 7, a volume switch 8 and a loudspeaker 9.

FIG. 2 shows the arrangement of control lines for the switches 5-1 to 5-16 and 6-1 to 6-8 and LEDs 5a-1 to 5a-16 and 6a-1 to 6a-8 as display elements. An octal ring counter 10 is operated by a clock $\phi$1. Output lines from the octal ring counter 10 are used as common column lines for a matrix section 11 and a matrix section 12. The output lines are labeled C1, C2, . . . , C8 from the left end one. The control lines for row lines of the matrix section 11 (labeled I1, I2 and I3 from the uppermost one) are commonly connected at one end through a resistor 13 and a power supply 14 to ground. The other end of the row lines is connected to a processing section 15, which processes a signal provided when the switches in the switch sections 5 and 6 are depressed. The processing section 15 includes a section to which signal a from the tone switch section 5 is fed and a section 15b to which signal a from the rhythm switch section 6 is fed. The signal from the processing section 15 is fed to a musical signal generating section and also to a drive signal generating section 16 including a buffer and a decoder for controlling the on-off operation of the LEDs 5a-1 to 5a-16 and 6a-1 to 6a-8. The drive signal generating section 16 includes a section 16a for controlling the on-off operation of the LEDs 5a-1 to 5a-16 and a section 16bfor controlling the on-off operation of the LEDs 6a-1 to 6a-8. The signal from the drive signal generating section 16 is used to appear on the row line control lines (labeled L1, L2 and L3 from the uppermost one) of the matrix 12.

Figure 3A:
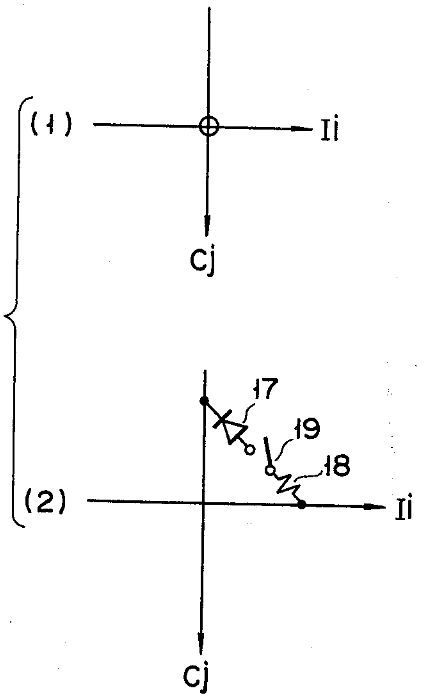
FIGS. 3A and 3B are views showing intersections of the matrix sections shown in FIG. 2.

FIG. 3 illustrates the method of connection of the column and row lines of the matrix sections 11 and 12. In FIG. 3A, shown at (1) is the intersection of control lines in the matrix section 11. The control lines Cj (j=1 to 8) and Ii (i=1 to 3) of the row and column lines can be connected through a diode 17 and a resistor 18 by a switch 19 which corresponds to a switch in the switch sections 5 and 6, as shown at (2). When the control lines Cj and Ii are rendered conductive with the depression of the switch 19, the output of the control line I goes to a low level when the output of the control line Cj is at a low level.

Figure 3B:
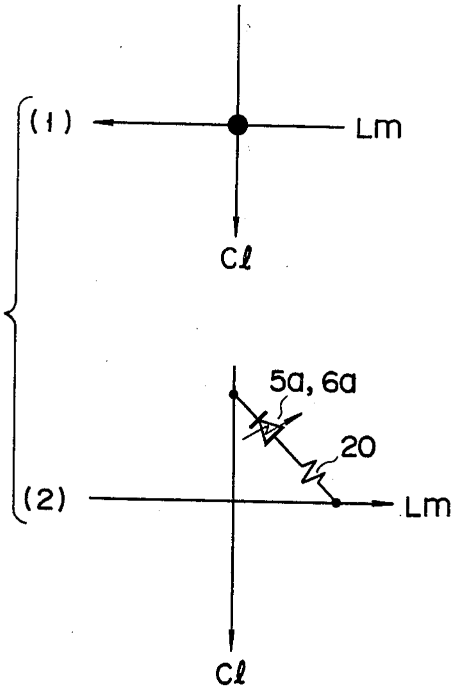

In FIG. 3B, shown at (1) is the intersection of control lines in the matrix section 12. The control lines Cl (l=1 to 8) and Lm (m=1 to 3) are connected to each other through the associated ones of the LEDs 5a-1 to 5a-16 and 6a-1 to 6a-8 (being typically shown at 5a and 6a) and a resistor 20. The associated ones of the LEDs 5a-1 to 5a-16 and 6a-1 to 6a-8 are "on" when the output on the control line Cl is at a low level and the output of the control line Lm is at a high level.

Figure 4A:
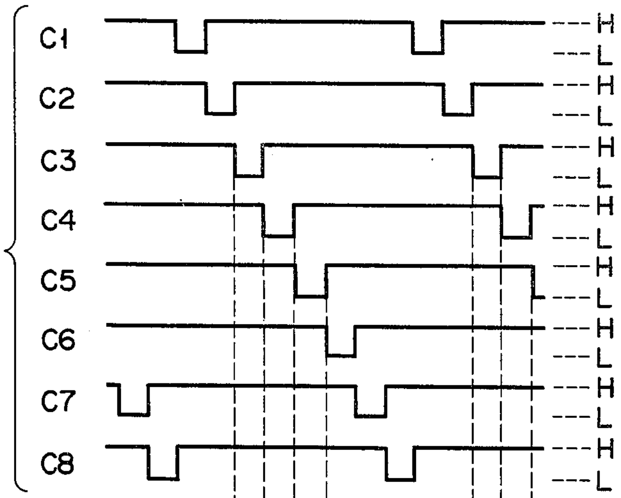
FIGS. 4A, 4B, and 4C are time charts for illustrating the operation of the circuit shown in FIG. 2.
Figure 4B:
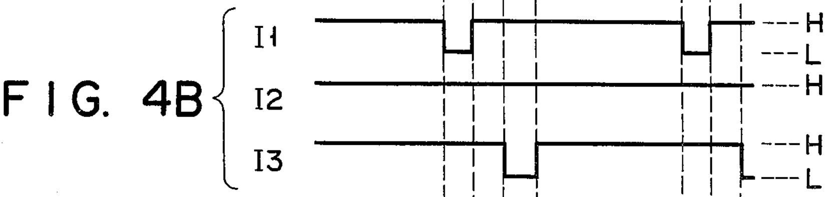
Figure 4C:
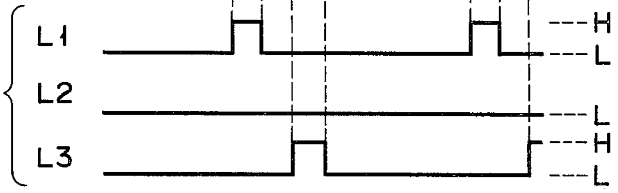

Now, the operation of this embodiment will be described with reference to a time chart of FIG. 4. Shown in (a) in FIG. 4 is the output of the ring counter 10. If switches at positions corresponding to the intersections (3, 1) and (5, 3) as intersection (j, i) of the matrix section 11 shown in FIG. 2, low level outputs are provided on the control lines I1 and I3 in synchronism to the control lines C3 and C6 as shown in (b) in FIG. 4. In other words, the code fed to the processing section 15 is (0,1,1) (0 corresponding to the low level and 1 corresponding to the high level) when the low level signal is supplied to the control line C3, (1,1,0) when the low level signal is supplied to the control line C5 and (1,1,1) when the low level signal is supplied to one of the other control lines.

At this time, the LEDs at the positions (3, 1) and (5, 3) as the intersection (l, m) of the matrix 12 are turned on as the control lines L1 and L3 go to the high level at the output timing of the low level signal from the lines C3 and C5. In other words, the output code from the drive signal generating section 16 is (1,0,0) when the low level signal is provided from the control line C3, (0,0,1) when the low level signal is provided from the control line C5 and (0,0,0) when the low level signal is provided from one of the other control lines.

Figure 5:
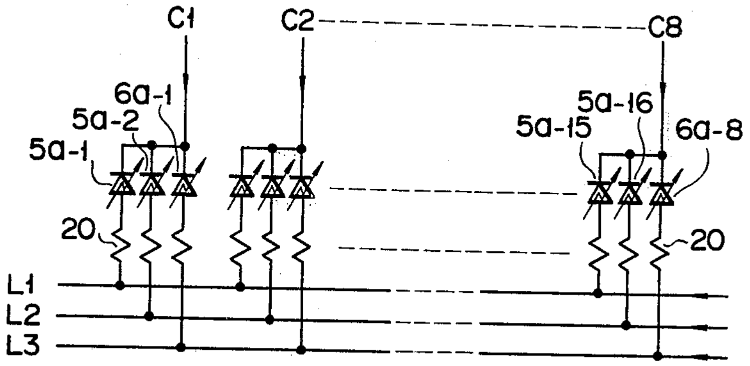
FIG. 5 is a circuit diagram showing a modification of the wiring of LEDs shown in FIG. 2.

The ring counter 10 may not be a ring counter, that is, it may be a binary counter or a counter. In a case where the replacement counter is used, the content of the buffer in the drive signal generating section 16 may be suitably altered. Further, the switch operation state can of course be displayed without operating any switch in the rhythm switch section but with the operation of a switch only in the tone switch section. Further, it is possible to arrange the display elements in a row and appropriately wire them as shown in FIG. 5. Even in such a case, the same matrix array wiring of the LEDs as that shown in FIG. 2 can of course be obtained. Further, while in the above embodiment the display elements are provided in correspondence to switches of an electronic musical instrument. This is by no means limitative, and the invention may be applied as well to another apparatus provided with a plurality of manually operable switches.

It is to be appreciated that with the above embodiment, in which the display elements corresponding to the manual switches are arranged and connected as a matrix, the operational state of these switches can be visually clearly confirmed. In addition, the wiring for driving these display elements can be greatly reduced, thus permitting the increase of efficiency of the operation of assembling the electronic musical instrument.

The wiring can further be reduced by making common the wiring for driving the display elements and the wiring for scanning the switches to check the "on" or "off" state thereof. Further, the number of terminals, from which the drive signals and scanning signals are provided, can be reduced, which is very useful from the standpoint of implementation of the electronic circuit with LSI.

Figure 6:
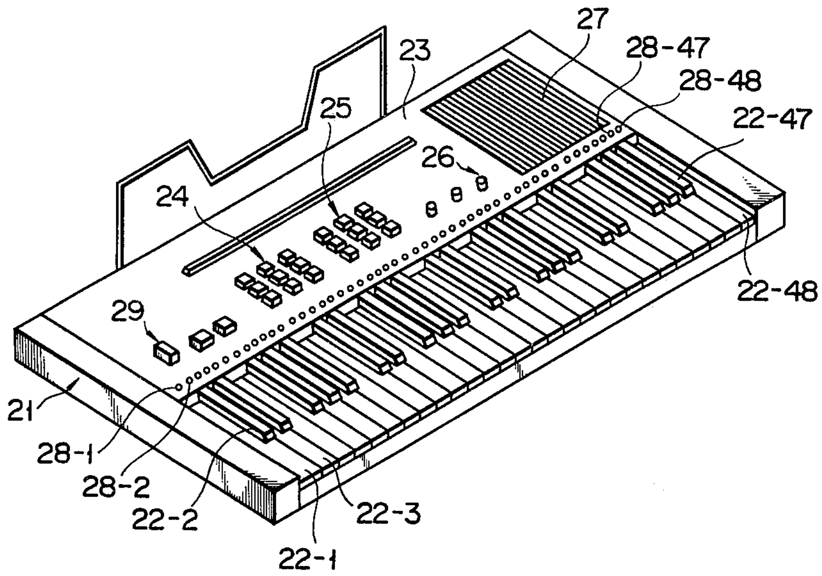
FIG. 6 is a perspective view of a different embodiment of the electronic musical instrument according to the invention.

Now, a second embodiment of the invention will be described. Referring to FIG. 6, on top of a front portion of case 21, a keyboard having keys 22-1 to 22-4 is provided, and an operating panel 23 is provided behind the keyboard. On the operating panel 23, a rhythm switch section 21, a tone switch section 25, a volume switch section 26 and a loudspeaker 27 are provided. Further, LEDs 28-1 to 28-48 are provided at positions corresponding to the keys 22-1 to 22-48 of the keyboard. A switch operating section 29 for operating the LEDs 28-1 to 28-48 is also provided on the operating panel 23.

FIG. 7 shows the arrangement of control lines for the switches 22-1 to 22-48 and LEDs 28-1 to 28-48. An octal ring counter 30 is operated by a clock $\phi 1$. Output lines from the ring counter 30 are used as common column lines for a matrix section 31, where control lines from the keys 22-1 to 22-48 from the keyboard are arranged in a matrix form, and a matrix section 32, where control lines from the LEDs 28-1 to 28-48 are arranged in a matrix form. The output lines are labeled C1, C2, . . . , C8 from the left end one. The control lines for the row lines of the matrix 31 (labeled I1, I2 and I3 from the uppermost one) are commonly connected at one end through a resistor 33 and a power supply 34 to ground. The other end of the row lines is connected to a processing circuit section 35, which processes a signal provided when a key is depressed. The signal from the processing circuit section 35 is fed to a musical sound generating section and also fed to a drive signal generating section 36, which includes a RAM, a decoder, etc. and controls the on-off operation of the LEDs 28-1 to 28-48. The output lines of the drive signal generating section 36 are used as control lines for the row lines of the matrix section 32 (labeled L1, L2, . . . , L6) from the uppermost one).

Figure 8A:
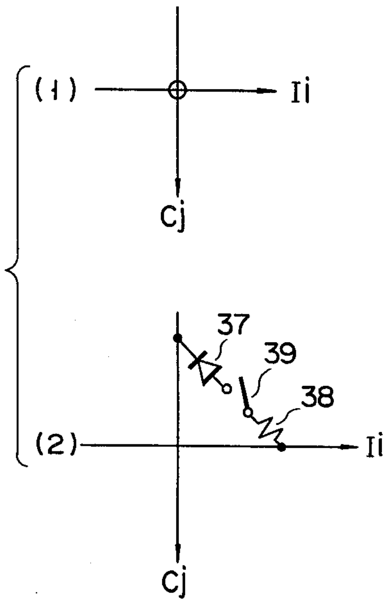
FIGS. 8A and 8B are views showing intersections of the matrix sections shown in FIG. 6.
Figure 8B:
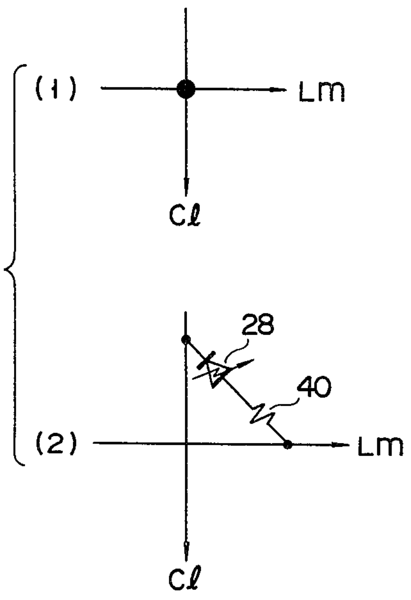

FIG. 8 illustrates the method of connection of the control lines for the row and column lines of the matrixes 31 and 32. In FIG. 8A, shown at (1) is the intersection of control lines in the matrix sections 31 and 32. The control lines Cj (j=1 to 8) and Ii (i=1 to 6) of the row and column lines can be connected through a diode 37 and a resistor 38 by a switch 39, which corresponds to one of the switches 22-1 to 22-48 in the keyboard. When the control lines Cj and Ii are rendered conductive with the depression of the switch 39, the output of the control line I goes to a low level when the output of the control line C is at a low level. In FIG. 8B, shown at (1) is the intersection of control lines of the matrix section 32. The control lines Cl (l=1 to 18) and Lm (m=1 to 6) are connected to each other through the associated one of the LEDs 28-1 to 28-48 and a resistor 40. The associated one of the LEDs 28-1 to 28-48 is turned on when the output on the control line Cl is at a low level and the output on the control line Lm is at a high level. The LED here is typically shown as LED 28.

Now, the operation of this embodiment will be described with reference to a time chart of FIG. 9. Shown in (a) in FIG. 9 is the output of the ring counter 30. If a key corresponding to the position (1,1) as the intersection (j, i) of the matrix section 31 is depressed, a low level output is provided from the control line I1 in synchronism to the appearance of a low level output on the line C1. Thus, the code coupled to the processing circuit section 35 is (0,1,1,1,1,1) when the low level signal is provided from the control line C1 while it is (1,1,1,1,1,1) when the output is provided from the other control lines C2 to C8. If at this time one of the LEDs 28-1 to 28-48 that corresponds to a key to be depressed next is at a position (3, 6) as the intersection (l, m) of the matrix section 32, a high level output is provided from the control line L6 in synchronism to the appearance of the output on the control line C3, as shown in (c) in FIG. 9. In other words, the output code from the drive signal generating section 36 is (0,0,0,0,0,1) only when the low level signal is provided from the control line C3 and is (0,0,0,0,0,0) when the output signal is provided from the other control lines. When one of the LEDs 28-1 to 28-48 that corresponds to a key to be depressed next is at a position (8, 2) as the intersection (l, m), a high level output is provided from the control line L2 in synchronism to the appearance of the low level signal from the control line C8. That is, the output code from the drive signal generating section 36 is (0,1,0,0,0,0) only when output is provided from the control line C8 and is (0,0,0,0,0,0) when output is provided from the other control lines.

While in the above embodiment the LEDs 28-1 to 28-48 are wired a matrix of 6 rows by 8 columns, it is also possible to arrange and wire the LEDs 28-1 to 28-48 in a single row. FIG. 10 shows this arrangement. Here, the LEDs 28-1 to 28-48 arranged in a row are connected through respective resistors 40 to the corresponding control lines L1, L2, . . . , L6, while at the other end they are connected as groups of six to the corresponding control lines C1, C2, . . . , C8. Even with this wiring, it is of course possible to arrange the LEDs 28-1 to 28-48 in a matrix form like the arrangement of FIG. 7.

Further, the ring counter 30 again may not be a ring counter and may be a binary counter or a counter as well, and in the latter case the content of the RAM may be suitably altered. Further, the data for progressively indicating the keys to be operated in the RAM in the drive signal generating section 36 may be preliminarily coupled in by using the keys on the keyboard. Alternatively, the data may be externally coupled in by using magnetic cards, paper tapes, bar codes or the like.

Further, while the above embodiment is concerned with a case where only a single key is depressed to produce a musical sound, it is also possible to arrange same such that when a chord consisting of the notes A, C and E is being produced, the LEDs for the notes G, B and E that form the chord to be produced next are turned on.

Further, while in the above embodiment the keys to be operated next are displayed, it is also possible to arrange same such that the LEDs corresponding to the keys being operated are held "on" to clearly indicate the keys being operated.

It is to be appreciated that with the above embodiment, with the display elements corresponding to the keys on the keyboard being arranged and wired as a matrix, it is possible to let the keys to be operated next or being operated be clearly confirmed. In addition, the wiring for driving these display elements can be greatly reduced, thus permitting the increase of efficiency of the operation of assembling the electronic musical instrument.

The wiring can further be reduced by making common the wiring for driving the display elements and the wiring for scanning the switches to check the "on" or "off" thereof. Further, the number of terminals, from which the drive signals and scanning signals are provided, can be reduced, which is very useful from the standpoint of implementation of the electronic circuit with LSI.

FIG. 11 shows a third embodiment of the invention. In this circuit of an electronic musical instrument, a matrix section 47 for scanning the keys 22-1 to 22-48 for the operational state thereof also serves as the matrix section for selectively turning on the LEDs 28-1 to 28-48. The column line side control lines of this matrix section 47 are labeled C1, C2, . . . , C8 from the left end one, and its row line control lines are labeled KC1, KC2, KC3 and KC4 from the uppermost one. The control lines KC1 to KC4 are connected to the output side of a key-in signal output port 49, and the control lines C1 to C12 are connected to the output side of the key-in common signal output port 50. The control lines C1 to C12 between the matrix section 47 and key-in common signal output port 50 are connected to respective control lines KI1 to KI12. The control lines KI1 to KI12 are connected to the input port 51. The content of the key-in input port 51 is supplied to the CPU 52. The CPU 52 operates according to the content of the key-in input port 51 to supply a key specification signal for specifying operated keys among the keys 22-1 to 22-48 on the keyboard to a sound generating section 53 for causing the section 53 to produce a musical sound corresponding to the operated key.

The CPU 52 includes various registers such as X and Y registers to which the content of the RAM 54 is transferred in the direction of the rows and an i register for storing the address data in the RAM 54. Data is transferred between the CPU 52 and RAM 54 in this way. When a key operation signal for specifying an operated switch among the various switches on the operating panel 23 is supplied from a switch control section 55 to the CPU 52, the CPU executes processing for the operated switch. In the RAM 54, musical sound data (note data and octave data) constituting a given piece of music has been progressively stored from the leading address in synchronism to the process of the piece of music, and an end code representing the end of the piece is stored in the last address. The RAM 54 is adapted to be given a read specification when a manual switch 29 for operating the LEDs 28-1 to 28-48 is operated. When a key corresponding to the musical sound data read out from the RAM 54 is operated, a specification signal for providing a musical sound of the corresponding note is supplied to the musical sound generating section 53. The writing of the musical sound data in the RAM 54 is made possible by operating the keys 22-1 to 22-48 on the keyboard in timed relation to the progress of the piece of music. Alternatively, it may be automatically effected by using, for instance, magnetic cards or a bar code reader for reading out bar codes from a medium where the musical data are recorded as bar codes.

The CPU 52 also provides a scanning signal to a bus line B for detecting the operated keys among the keys 22-1 to 22-48 on the keyboard. Further, it supplies a drive signal for turning on given ones of the LEDs 28-1 to 28-48 through the bus line B to a converting circuit 56 in a time zone other than the output timing of the aforementioned scanning signal according to the musical sound data read out from the RAM 54. The CPU 52 further supplies a control signal CT, which specifies the signal from the bus line B to be either the aforementioned scanning signal or drive signal, to the converting circuit 56. The converting circuit 56 serves to change the magnitude of the scanning signal and drive signal supplied from the bus line B according to the control signal CT. The drive signal provided from the converting circuit 56 is supplied to the key-in common signal output port 50 and key-in signal output port 49. Also, the scanning signal provided from the converting circuit 56 is supplied to the ports 50 and 49.

The method of connection of the control lines for the row and column lines of the matrix section 47 will now be described with reference to FIG. 12. FIG. 12 shows the intersection of control lines of the matrix section 47. The connection point A and A′ of the control lines Cj and Ki for the column and row lines are connected through a diode 57 and a switch 58 corresponding to one of the keys 22-1 to 22-48. In this case, the P terminal of the diode 57 is connected to the connection point A of the control line KCi. Also, the connection points B and B′ of the control lines Cj and KCi are connected through one of the LEDs 28-1 to 28-48. The P terminal of this LED is connected to the connection point B′ of the control line Cj. The threshold voltage of the LEDs 28-1 to 28-48 is 1.6 volts.

Now, the operation of this embodiment will be described with reference to FIGS. 13 to 17. When the operating switch 29 for operating the LEDs 28-1 to 28-48 is operated, the RAM 54 is rendered ready for readout, and a routine as shown in the flow chart of FIG. 13 is executed. In step S1, "0" is transferred to the i register where the address data for the RAM 54 is stored. Then, step S2 is executed, in which the content of the RAM 54, i.e., the content stored in the leading address thereof, is read out and transferred to the X register according to the content of the RAM 54. Then, step S3 is executed, in which the control signal CT for specifying one of the LEDs 28-1 to 28-48 to be turned on is supplied from the CPU 52 to the converting circuit 56. At this time, the content of the X register (musical sound data) is supplied as a drive signal for turning on the given one of the LEDs 28-1 to 28-48 to the converting circuit 56. The converting circuit 56 converts the aforementioned drive signal to the magnitude of a predetermined voltage and supplies it to the key-in common signal output port 50 and key-in signal output port 49. Thus, in the matrix section 47, the corresponding LED to the content of the X register is selectively turned on. Thus, before the performance of the musical piece stored in the RAM 54, the LED among the LEDs 28-1 to 28-48 corresponding to the key of the first note is turned on.

Then, step S4 is executed, in which the control signal C and a code signal, specifying the detection of the state of the key corresponding to the content of the X register are supplied from the bus line B to the converting circuit 56. The converting circuit 56 converts the aforementioned scanning signal to the magnitude of a predetermined voltage and supplies it to the key-in common signal output port 50 and key-in signal output port 49. Thus, in the matrix section 47 the detection of operation of the switch 58 is effected, and the result is supplied to the key-in signal input port 51. The CPU 52 judges if the key corresponding to the switch corresponding to the content of the X register, i.e., one of the LEDs 28-1 to 28-48 that is turned on, is depressed according to the content of the key-in signal input port 51. If it is judged at this time that the key corresponding to the aforementioned one of the LEDs 28-1 to 28-48 is not depressed, the routine returns to the step S3, and the steps S3 and S4 are repeatedly executed until the relevant key is depressed. If the key corresponding to the aforementioned one of the LEDs 28-1 to 28-48 is depressed, the routine proceeds to the next step S5.

In step S5, a note specification signal corresponding to the content of the X register is produced to cause generation of the musical sound of the corresponding note. Then, step S6 is executed, in which "1" is added to the content of the i register for incrementing the address of the RAM 54. Then, step S7 is executed, in which the content of the X register is transferred to the Y register. Then, step S8 is executed, in which the content of the RAM 54 specified by the content of the i register is transferred to the X register. Then, in step S9, like step S3, one of the LEDs 28-1 to 28-48 that corresponds to the key of the note represented by the content of the X register is selectively turned on. Thus, the LED corresponding to the key to be depressed next is turned on. Then, step S10 is executed, in which whether the key having been operated is released (i.e., turned off) is checked. If it is judged that the key remains "on", the routine goes back to step S9, and steps S9 and S10 are repeatedly operated until the detection of the release of the key. When the release of the key is detected, step S11 is executed, in which the prevailng musical sound is caused to disappear by a control signal provided from the CPU 52 to the sound generating section 53. At this time, one of the LEDs 28-1 to 28-48 that corresponds to the key to be depressed next continues to be "on".

When, step S12 is executed, in which whether musical sound data from the RAM 54 is all read out is checked, that is, whether the content transferred to the X register is an end code is checked. If it is determined at this time that the content of the X register is not any end code, the routine returns to the step S3, and the steps S3 through S12 are repeated until an end code is transferred to the X register.

Figure 14:
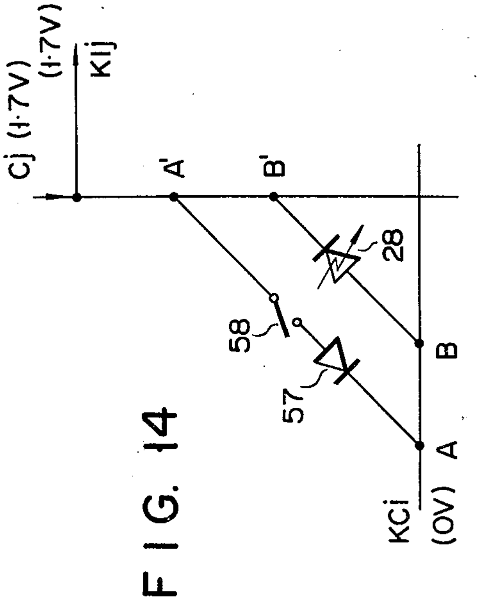
Figure 15:
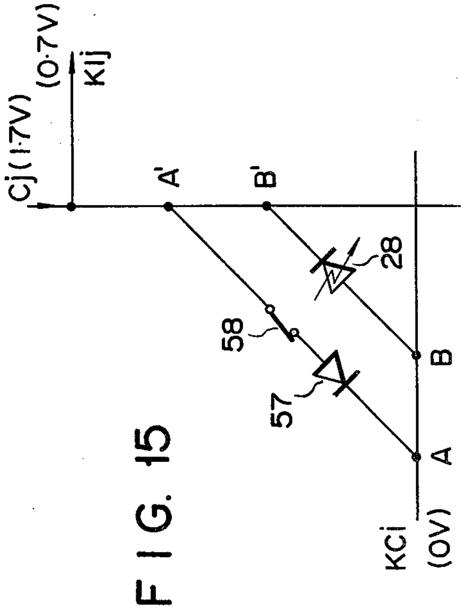

Now, the operation of the matrix section 47 will be described with reference to FIGS. 14 to 17. When the control signal CT specifying the scanning of the keys 22-1 to 22-48 in the operation state is provided from the CPU 52 to the converting circuit 56, a scanning signal at 1.7 volts is supplied to the control line Cj of the matrix section 47, and also a scanning signal normally at 1.7 volts and at 0 volt at the time of the scanning is supplied to the control line KCi. If at this time the switch 58 is "off" as shown in FIG. 14, a voltage signal at 1.7 volts is being provided from the control line KIj. When the switch 58 is turned on, the contact points A and A' of the control lines Cj and KC are connected to each other as shown in FIG. 15, and a voltage signal of 0.7 volt is provided from the control line KIj due to the voltage drop across the diode 57. The CPU 52 detects the state of the switch 58, either in the "on" or "off" state, depending upon whether the voltage of the key-in signal supplied from the key-in signal input port 51 is 1.7 volts or 0.7 volt. While the scanning regarding the "on" or "off" state of the switch 58 is being made, the LEDs 28-1 to 28-48 are in the reversely biased state and are thus "off" irrespective of whether the switch 58 is "on" or "off".

Figure 16:
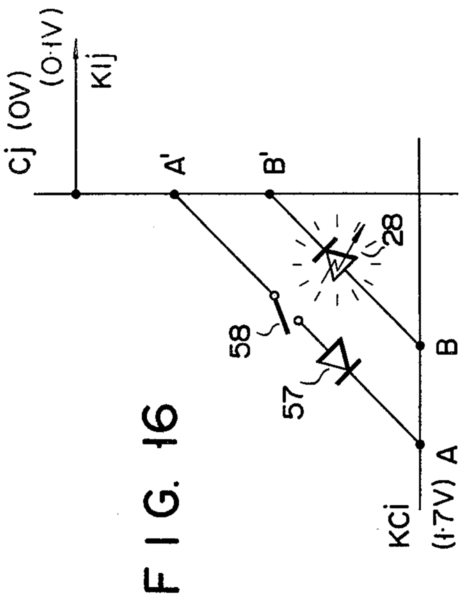
Figure 17:
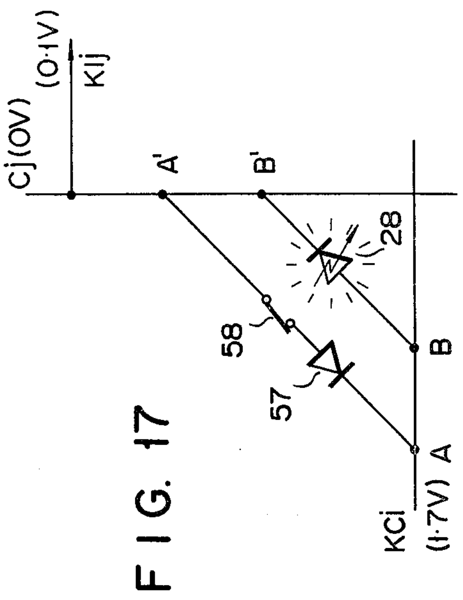

Also, when the control signal CT specifying the turning-on of the LEDs 28-1 to 28-48 is supplied to the converting circuit 56, a drive signal at 0 volt is supplied to the control line Cj of the matrix section 47, while a drive signal at 1.7 volts is supplied to the control line KCi, as shown in FIGS. 16 and 17. At this time all the other column and row lines are respectively held at 1.7 volts and 9 volts. Since the threshold voltage of the LEDs 28-1 to 28-48 is at 1.6 volts, the LED 28 is turned on, and with the voltage drop across the LED a voltage signal at 0.1 volt is provided from the control line KIj. Thus, irrespective of whether the switch 58 is "on" or "off", the LED 28 continues to be "on", and the output signal on the control line KIj is always at 0.1 volt.

Figure 18:
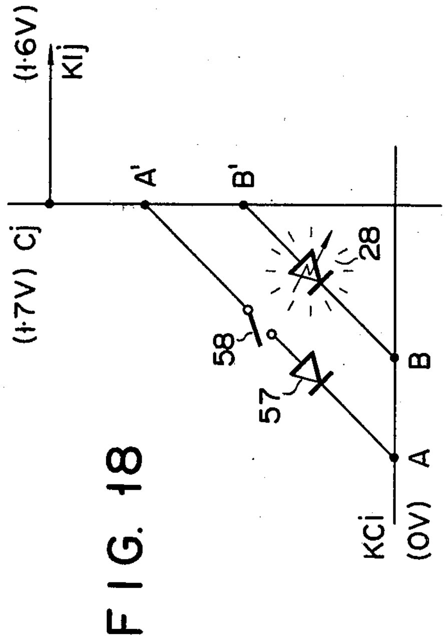
Figure 19:
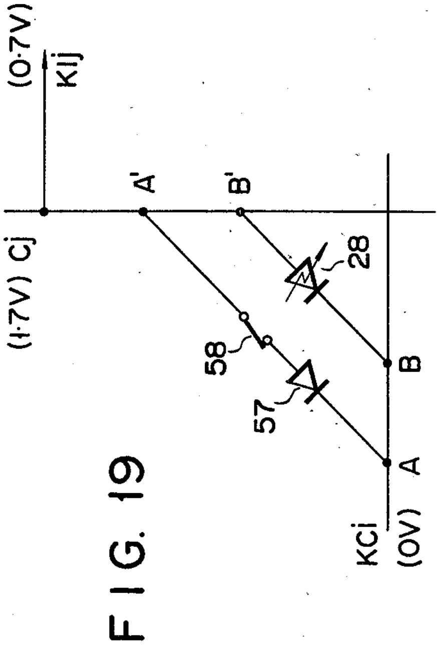

A different example of the matrix section will now be described with reference to FIGS. 18 to 21. In this example, the diode 57 is connected in the same polarity as the P terminal of the LED 28 to the control line KCj. For turning on the LED 28, a drive voltage at 1.7 volts is supplied to the control line Cj, while a drive signal at 0 volt is supplied to the control line KCi, as shown in FIG. 18. In this case, voltages 1.7 volts and 0 volt are respectively applied to the control lines KCi and Cj which do not turn on any LED. When the switch 58 is "off", the LED 28 is "on" as shown in FIG. 18, so that a voltage signal at 1.6 volts is provided from the control line KIj. When the switch 58 is turned on, the LED 28 is turned off as shown in FIG. 19, so that a voltage signal at 0.7 volt is provided from the control line KIj.

Figure 20:
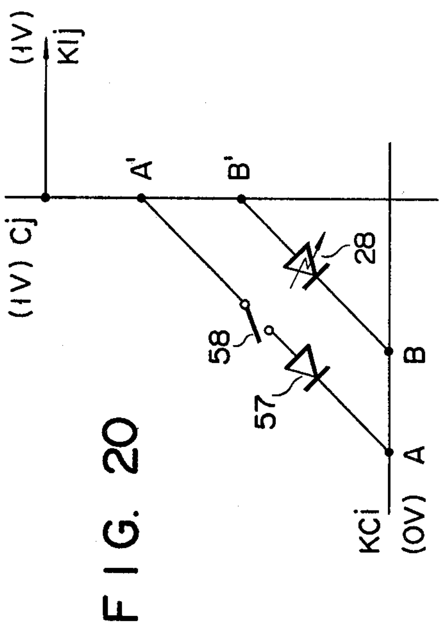
Figure 21:
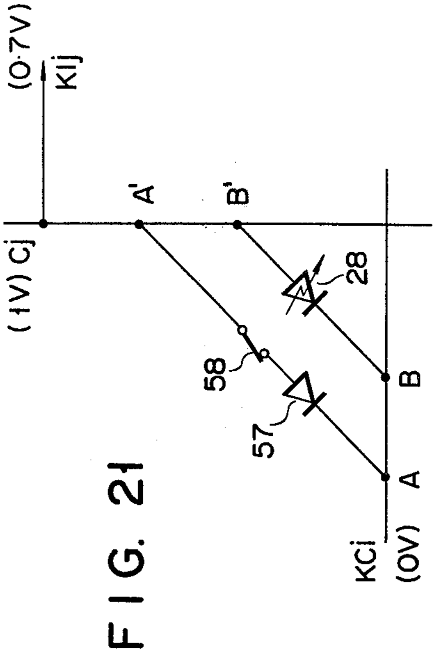

When scanning regarding the switch 58 is being made, a scanning signal at 1 volt is supplied to the control line Cj as shown in FIG. 20. Also, the scanning signal which is normally at 1.7 volts and at 0 volt at the time of the scanning, is supplied to the control line KCi. In this case, if the switch 58 is "off", a voltage signal at 1 volt is provided from the control line KIj as shown in FIG. 20. Further, when the switch 58 is turned on, a voltage signal at 0.7 volt is provided from the control line KIj as shown in FIG. 21. Thus, the CPU 52 detects the "on" or "off" state of the switch 58 depending from whether the key-in signal provided from the key-in signal input port 51 is at 1 volt or 0.7 volt.

While the above embodiment was directed to a case where only a single key is depressed to produce a musical sound, it is also possible to arrange same such that when a chord consisting of the notes A, C and E is being produced, the LEDs for the notes G, B and E that form the chord to be produced next are turned on.

Also, while in the above embodiment the keys to be operated next are displayed, it is also possible to arrange same such that the LEDs corresponding to the keys being operated are held "on" to clearly indicate the keys being operated.

Further, while the above embodiment has a plurality of keys, this is by no means limitative, and the invention is applicable for use with the tone select switch or rhythm select switch as well.

It is to be appreciated that with the above embodiment it is possible to reduce the amount of wiring in the matrix section for turning on the display elements, thus permitting the increase of the efficiency of the operation of assembling the electronic musical instrument. Besides, the number of terminals for providing drive signals for driving the display elements can be reduced, which is very useful from the standpoint of implementing the electronic circuit with LSI.

While the above embodiments have concerned with electronic musical instruments, this is by no means limitative, and the invention may also be applied to various types of electronic apparatus.

What is claimed is:

1. An electronic musical instrument having a plurality of operation keys and display devices provided for said respective operation keys, comprising:
   - matrix wiring means coupled to said operation keys and including intersecting row lines and column lines for wiring said plurality of operation keys in a matrix;
   - wiring means coupled to said display devices for connecting display devices corresponding to said plurality of operation keys to said row lines and column lines of said matrix wiring means at the intersections of said row lines and column lines of said matrix;
   - scanning signal generating means coupled to said matrix wiring means for supplying a scanning signal to said matrix wiring means for scanning said plurality of operation keys; and
   - drive signal generating means coupled to said matrix wiring means for supplying a drive signal to said matrix wiring means for selectively turning one said display devices.

2. The electronic musical instrument according to claim 1, wherein said drive signal generating means supplies said drive signal for selectively turning on said display devices to said matrix wiring means at a time other than at the timing when said scanning signal is output by said scanning signal generating means.

3. The electronic musical instrument according to claim 2, wherein said drive signal generating means includes means for turning on said display devices by varying the voltage level of said drive signal.

4. The electronic musical instrument according to claim 1, wherein said plurality of operation keys are performance keys related to individual musical notes.

5. The electronic musical instrument according to claim 1, wherein said plurality of operation keys are operation switches of said musical instrument.

6. The electronic musical instrument according to claim 5, wherein said operation keys comprise at least one of a tone select switch and a rhythm select switch.

7. The electronic musical instrument according to claim 1, further comprising key operation detecting means coupled to said matrix wiring means for detecting key depressions of said operation keys according to signals delivered from said matrix wiring means, said drive signal generating means being responsive to said key operation detecting means for supplying said drive signal for selectively turning on said display devices.

8. The electronic musical instrument according to claim 7, comprising time sharing means coupling said scanning signal and said drive signal to said matrix wiring means in a time-shared manner.

9. An electronic apparatus having a plurality of operation keys and display devices provided for said respective operation keys, comprising:

matrix wiring means coupled to said operation keys and including intersecting row lines and column lines for wiring said plurality of operation keys in a matrix;

wiring means coupled to said display devices for connecting said display devices corresponding to said plurality of operation keys to said row lines and column lines of said matrix wiring means at the intersections of said row lines and column lines of said matrix;

scanning signal generating means coupled to said matrix wiring means for supplying a scanning signal to said matrix wiring means for scanning said plurality of operation keys;

key operation detecting means coupled to said matrix wiring means for detecting key depressions of said operation keys according to signals delivered from said matrix wiring means; and drive signal generating means coupled to said matrix wiring means and to said key operation detecting means for supplying a drive signal to said matrix wiring means for selectively turning on said display devices in accordance with the detected key depressions of said operation keys.

10. The electronic apparatus according to claim 9, wherein said drive signal generating means supplies said drive signal for selectively turning on said display devices to said matrix wiring means at a time other than at the timing when said scanning signal is output by said scanning signal generating means.

11. The electronic apparatus according to claim 10, wherein said drive signal generating means includes means for turning on said display devices by varying the voltage level of said drive signal.

12. The electronic musical instrument according to claim 10, comprising time sharing means coupling said scanning signal and said drive signal to said matrix wiring means in a time-shared manner.

* * * * *